(12) United States Patent
Ghosh et al.

(10) Patent No.: US 11,662,982 B1
(45) Date of Patent: May 30, 2023

(54) INTELLIGENT RECOMMENDATION FOR CREATION OF SOFTWARE ARCHITECTURAL DIAGRAMS

(71) Applicant: International Business Machines Corporation, Armonk, NY (US)

(72) Inventors: Partho Ghosh, Kolkata (IN); Sarbajit K. Rakshit, Kolkata (IN); Akash U. Dhoot, Pune (IN); Shailendra Moyal, Pune (IN)

(73) Assignee: International Business Machines Corporation, Armonk, NY (US)

( * ) Notice: Subject to any disclaimer, the term of this patent is extended or adjusted under 35 U.S.C. 154(b) by 56 days.

(21) Appl. No.: 17/530,880

(22) Filed: Nov. 19, 2021

(51) Int. Cl.
  G06F 9/44 (2018.01)
  G06F 8/10 (2018.01)
  G06N 3/08 (2023.01)
  G06F 16/33 (2019.01)

(52) U.S. Cl.
  CPC .......... *G06F 8/10* (2013.01); *G06F 16/3344* (2019.01); *G06N 3/08* (2013.01)

(58) Field of Classification Search
  CPC .......... G06F 8/10; G06F 16/3344; G06N 3/08
  USPC .................................. 717/101–105
  See application file for complete search history.

(56) References Cited

U.S. PATENT DOCUMENTS

| | | | |
|---|---|---|---|
| 10,643,144 B2 * | 5/2020 | Bowers | G06N 20/00 |
| 11,151,617 B2 * | 10/2021 | Wilson | G06Q 30/0282 |
| 11,520,564 B2 * | 12/2022 | Malvankar | G06F 16/285 |
| 2011/0099532 A1 | 4/2011 | Coldicott et al. | |
| 2019/0171948 A1 | 6/2019 | Pillai et al. | |
| 2019/0356555 A1 | 11/2019 | Bai | |
| 2021/0064965 A1 * | 3/2021 | Pardeshi | A63F 13/79 |

FOREIGN PATENT DOCUMENTS

GB    2580866 A    8/2020

OTHER PUBLICATIONS

Ohsugi et al., "A Recommendation System for Software Function Discovery", IEEE, 2002, 10 pages. (Year: 2002).*
Isinkaye et al., "Recommendation systems: Principles, methods and evaluation", 2015, Elsevier, pp. 261-273. (Year: 2015).*
Rahman et al., "Classifying Non-functional Requirements using RNN Variants for Quality Software Development", 2019, ACM, pp. 25-30. (Year: 2019).*

* cited by examiner

*Primary Examiner* — Ted T. Vo
(74) *Attorney, Agent, or Firm* — Stephen J. Walder, Jr.; Steven Bouknight

(57) ABSTRACT

An architectural diagram recommendation engine is implemented in a data processing system for software architectural diagram analysis and recommendation. The architectural diagram recommendation engine analyzes a software requirements specification document using natural language processing to identify functional requirements and security requirements. The architectural diagram recommendation engine analyzes a digital software architectural diagram image to identify functional components and identifies one or more discrepancies between the functional components of the digital software architectural diagram image and the functional requirements or security requirements. The architectural diagram recommendation engine generates an alert concerning the one or more discrepancies and presents the alert in association with the digital software architectural diagram image.

20 Claims, 7 Drawing Sheets

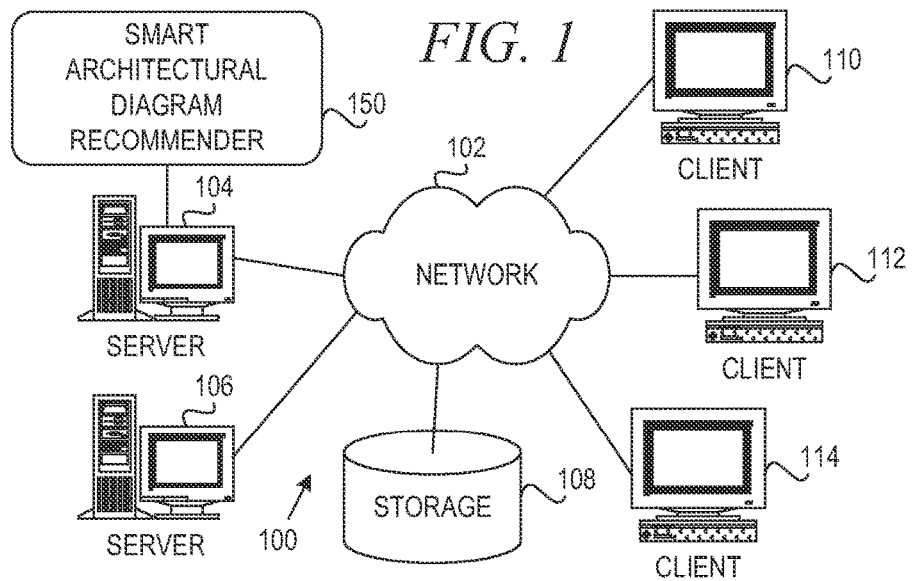
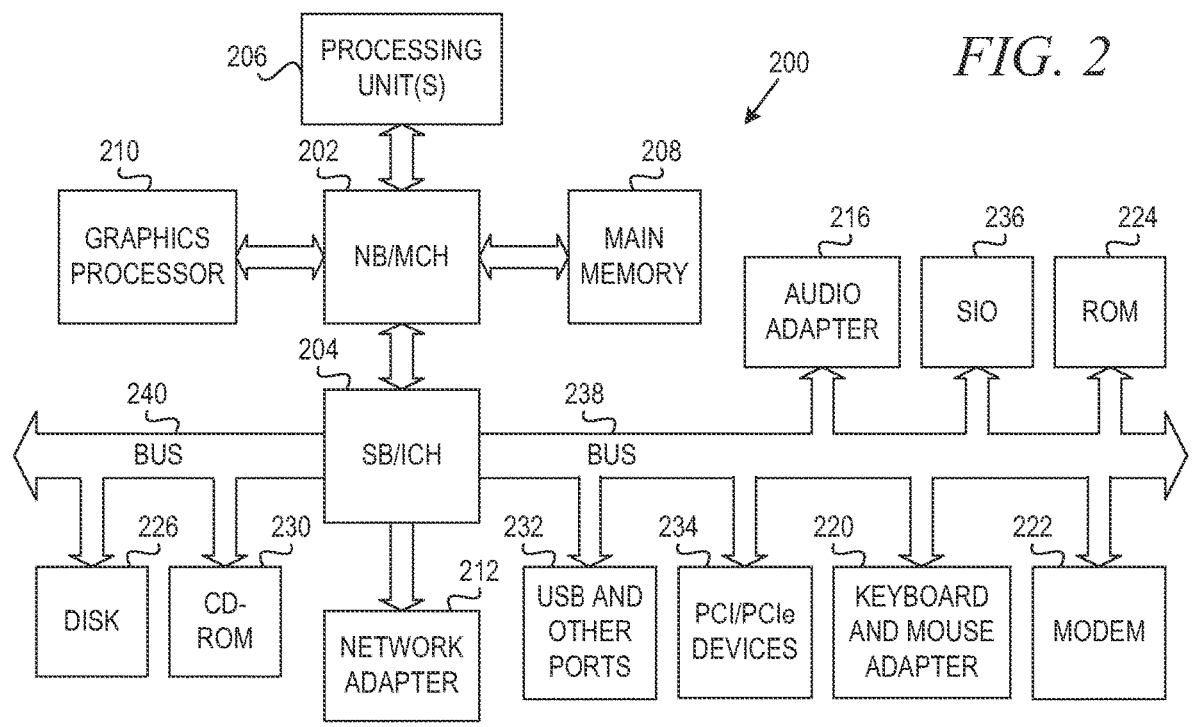

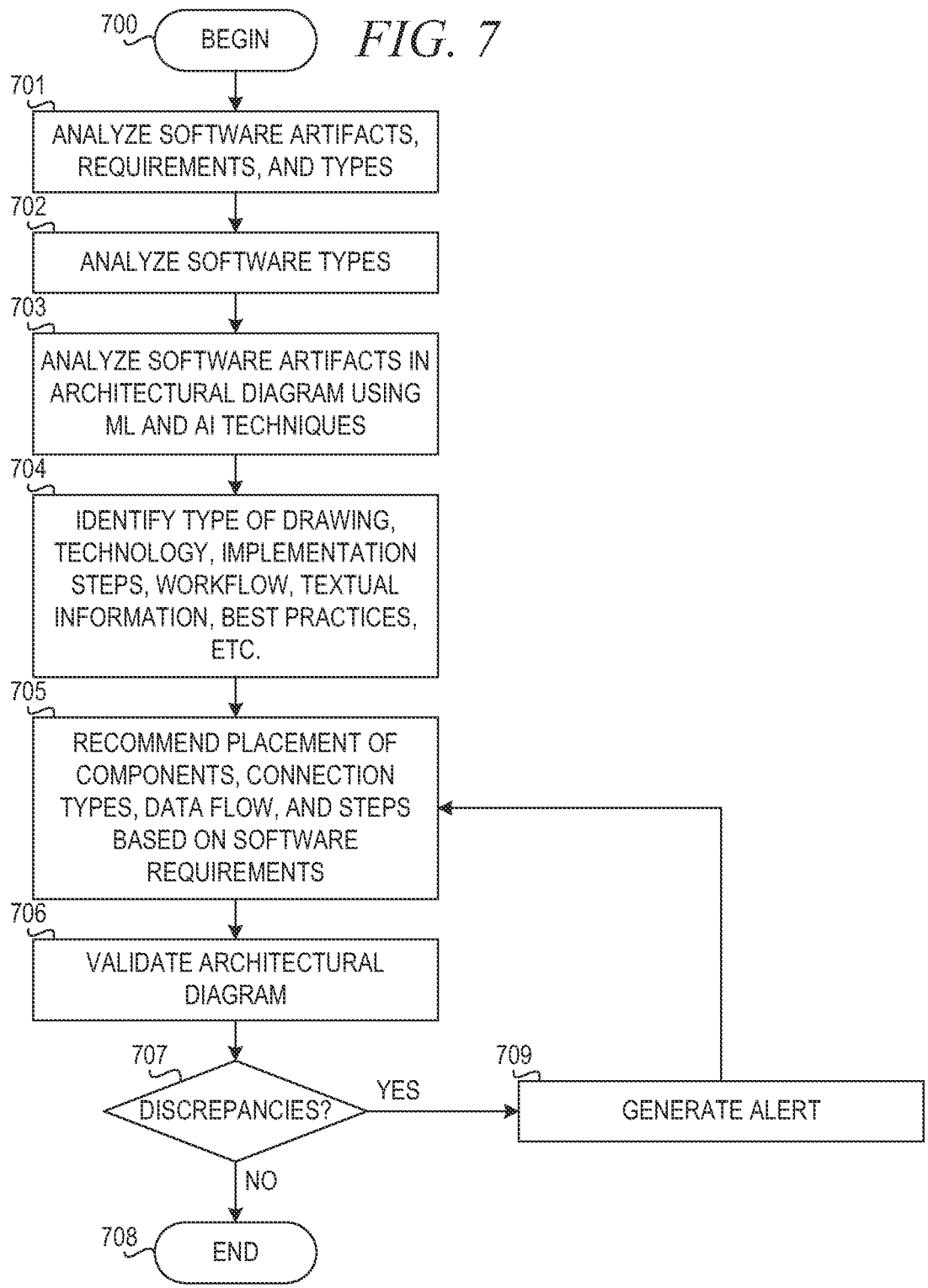

INTELLIGENT RECOMMENDATION FOR CREATION OF SOFTWARE ARCHITECTURAL DIAGRAMS

BACKGROUND

The present application relates generally to an improved data processing apparatus and method and more specifically to mechanisms for intelligent recommendation for creation of software architectural diagrams.

Software architecture is a common abstraction of a system to be designed. Most if not all stakeholders can use a software architectural diagram as a basis for understanding, negotiation, consensus, and communication between one another. The software architectural diagram shows earliest system design decisions, and these early bindings carry much less weight than their individual weight in relation to the continued development, deployment, and service life of the system. The software architectural diagram is the earliest stage to analyze design decisions of the system to be built. A small and intellectually understandable model for the structure and collaboration of a system, the software architectural diagram is a transferrable model across systems. It can be applied in particular to other systems with similar quality attributes and functional requirements and can promote wide reuse.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system comprising at least one processor and at least one memory, the at least one memory comprising instructions executed by the at least one processor to cause the at least one processor to implement an architectural diagram recommendation engine for software architectural diagram analysis and recommendation. The method comprises analyzing, by the architectural diagram recommendation engine, a software requirements specification document using natural language processing to identify functional requirements and security requirements. The method further comprises analyzing, by the architectural diagram recommendation engine, a digital software architectural diagram image to identify functional components. The method further comprises identifying, by the architectural diagram recommendation engine, one or more discrepancies between the functional components of the digital software architectural diagram image and the functional requirements or security requirements. The method further comprises generating, by the architectural diagram recommendation engine, an alert concerning the one or more discrepancies. The method further comprises presenting, by the architectural diagram recommendation engine, the alert in association with the digital software architectural diagram image.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 1 is an example diagram of a distributed data processing system in which aspects of the illustrative embodiments may be implemented;

FIG. 2 is an example block diagram of a computing device in which aspects of the illustrative embodiments may be implemented;

FIG. 7 is a flowchart illustrating operation of a smart architectural diagram recommendation system in accordance with an illustrative embodiment.

DETAILED DESCRIPTION

Figure 3:
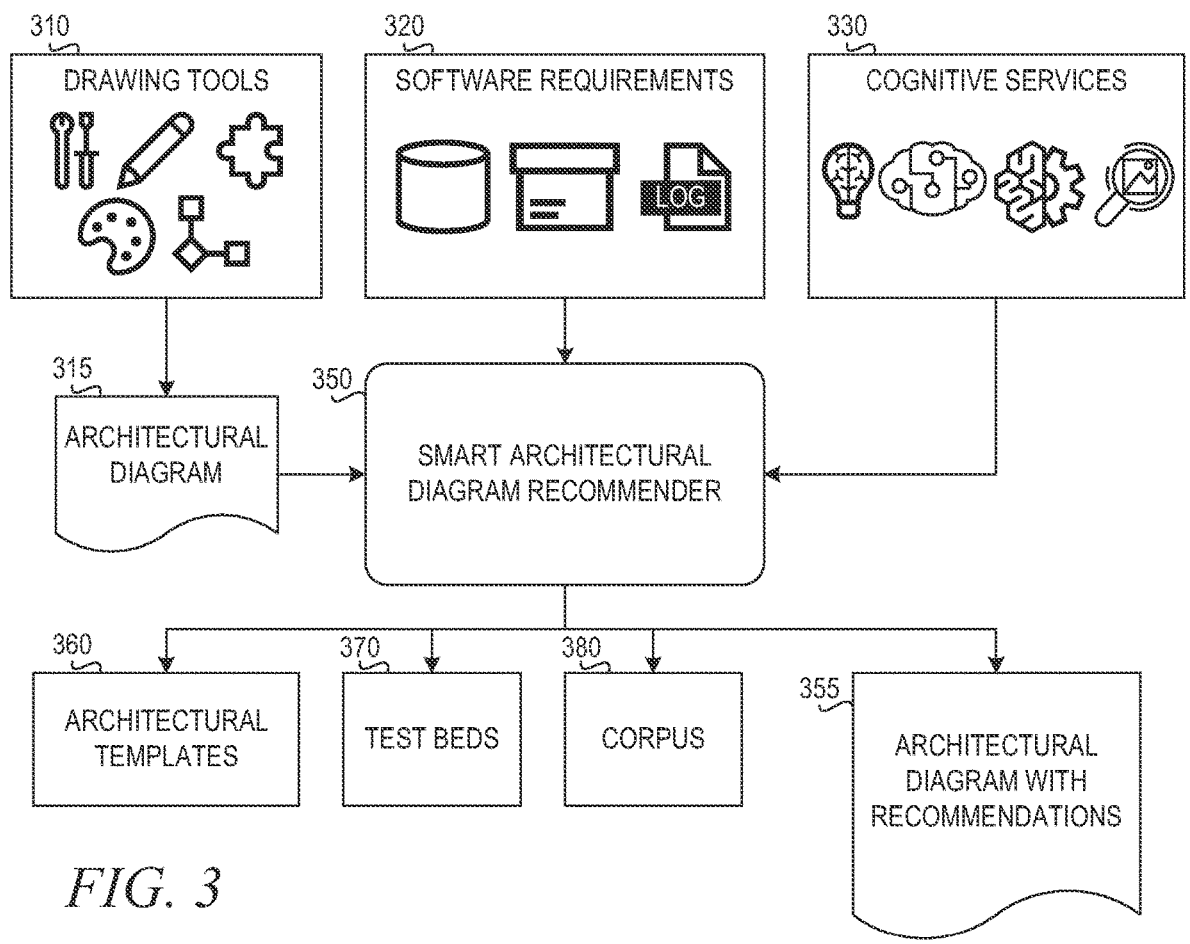
FIG. 3 is a block diagram illustrating a smart software architecture diagram analysis and recommendation system in accordance with an illustrative embodiment.

The need for correct, modular architectural diagrams plays a key role in determining system quality, security, data pipeline flows, etc. As architectural diagrams are a one-stop reference and backbone for a successful software system for all stakeholders that can use the diagrams as a basis for understanding, negotiation, consensus, and communication between one another, lapses in various components of an architectural diagram can cause credible violations during interpretation, analysis, development, and quality of a software application.

The illustrative embodiments provide mechanisms for using artificial intelligence (AI) and machine learning (ML) to analyze various software requirements and types and thereby recommend in real time placement of components, connection types, data flow and pipeline sequences, and steps and sequences during creation of digital architectural diagram images aligning with software requirements so that the architectural diagram images are created in an optimized manner. The illustrative embodiments also provide mechanisms for validating software architectural diagrams and generating alerts or notifications when discrepancies or breaches are detected in the blocks or components of various architectural diagrams and models based on security, functionality, firewall, connection types, and services.

The illustrative embodiments also create a corpus of digital diagram images and their corresponding correlated standard software requirement documents and classify them into standard templates (e.g., industry-based, technology, platform, business need, security, etc.) based on the depth and level of control, security, complexity, etc. The illustrative embodiments automatically create multifarious templated standard architectural diagrams and models using AI-based historical learning and corpus generation using transfer learning. The multifarious diagrams and models may include, for example, system context diagram, use case model, architectural overview diagram, static functional view, data model, interaction diagram, logical location view, zone model, logical operational model, reference architecture, sized and unsized physical operational model. In addition, the illustrative embodiments enable AI-based architectural diagram test beds and testing sequence wherein the system can take in existing diagrams and validate them with recommendations for how the diagrams are to be evolved or auto-scaled in alignment with software requirements or types.

While the examples shown and described herein refer to software architectural diagrams, aspects of the illustrative embodiments may be applied to other types of architectural diagrams. The smart recommendation engine of the illustrative embodiments may apply to any field or technology where AI and ML techniques can be used to ingest and understand textual design specifications and to recognize and classify design elements in a digital image. For example, the illustrative embodiments may aid a user in creating and validating architectural diagrams for a mechanical device based on design specifications. In addition, the illustrative embodiments may apply to architectural floor plans, electrical systems, plumbing, components of a business model, etc.

The illustrative embodiments address the technological problem associated with human error in early stages of software development. The illustrative embodiments provide a computer tool that uses computer artificial intelligence and machine learning to create digital software architectural diagram images from templates and historical examples, aid the user in creating software architectural diagrams, validate digital software architectural diagram images, alert the user when discrepancies between software requirements and architectural diagrams are detected, recommend placement of components in the software architectural diagrams, and provide interpretation of software architectural diagrams. The computer tool provided by the illustrative embodiments performs activities that cannot as a practical matter be performed in the human mind. The computer tool provided by the illustrative embodiments detects discrepancies that were either created by the human user or missed by the human user.

Furthermore, the computer tool provided by the illustrative embodiments provides improvements in the field of computer aided drawing tools, because the smart architectural diagram recommendation engine of the illustrative embodiments enables the computer aided design tools to perform functions they did not previously perform. In addition, the smart architectural diagram recommendation engine improves the accuracy and effectiveness of the computer aided design tools by producing improved software architectural diagrams. Still further, the smart architectural diagram recommendation engine of the illustrative embodiments improves the field of software development by providing digital software architectural diagram images that comport with the software requirement definition documents early in the development process, thus requiring less effort later in the development process.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or elements present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

In accordance with an illustrative embodiment, a smart architectural diagram recommendation engine 150 is provided for analyzing digital software architectural diagram images and recommending placement of components, connection types, data flow and pipeline sequences, and steps and sequences during creation of digital architectural diagrams aligning with software requirements so that the architectural diagrams are created in an optimized manner. The smart architectural diagram recommendation engine 150 validates software architectural diagram images and generates alerts or notifications when discrepancies or breaches are detected in the blocks or components of various architectural diagrams and models based on security, functionality, firewall, connection types, and services. The smart architectural diagram recommendation engine 150 discovers issues with software architecture early in the process before developers generate code and recommends changes to the architecture to ensure the software architecture is functional and secure.

As shown in FIG. 1, one or more of the computing devices, e.g., server 104, may be specifically configured to implement a system for intelligent recommendation for creation of digital software architectural diagram images. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates intelligent recommendation for creation of digital software architectural diagram images.

These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. In a client device, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, data processing system 200 may be, for example, an IBM eServer™ System p® computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the system for intelligent recommendation for creation of digital software architectural diagram images.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

FIG. 3 is a block diagram illustrating a smart software architecture diagram analysis and recommendation system in accordance with an illustrative embodiment. A designer uses drawing tools 310 to generate digital architectural diagram image 315. Drawing tools 310 may include line drawing and painting software, vector-based graphics programs, computer-aided design (CAD) software, presentation software, and the like. In one example embodiment, drawing tools 310 comprise a special-purpose software architectural diagram authoring environment including premade drawing shapes and specialized tools. Architectural diagram image 315 may be one of multifarious standard architectural diagram and model types, such as system context diagram, use case model, architectural overview diagram, static functional view, dynamic functional view, data model, interaction diagram, logical location view, zone model, logical operational model, reference architecture, sized operation model, unsized physical operational model, etc.

Smart architectural diagram recommendation engine 350 analyzes architectural diagram image 315 with reference to software requirements 320 and using cognitive services 330. A software requirements specification is a document that describes requirements for a software product, program, or set of programs. Requirements in the software requirements specification 320 are expressed in normal language and are not concerned with technical implementation. In software development, the software requirements specification 320 represents the results of the requirements analysis and describes the requirements of the software under development. Smart architectural diagram recommendation engine 350 analyzes software requirements specification 320 by performing natural language processing and identifying functional components, user roles, interface elements, communication protocols, and the like.

Cognitive services 330 provide artificial intelligence (AI) and machine learning (ML) tools that the smart architectural diagram recommendation engine 350 use to analyze digital architectural diagram image 315 and software requirements 320, to make decisions about detecting discrepancies and breaches of security, and to generate recommendations for changes to architectural diagram image 315. In one embodiment, cognitive services 330 include knowledge processing, natural language processing, machine learning, computer vision, planning/control, and the like. Cognitive services 330 may include software and specialized hardware for understanding both architectural diagrams and software requirements specifications. The field of knowledge processing involves representing and deriving facts about the world and using this information in automated systems. Modern AI algorithms require considerable computing power. AI hardware includes physical computer components designed to meet this requirement through increased processing efficiency and/or speed. Understanding and using data encoded in written language is the domain of natural language processing. Computer vision extracts and understands information from images and video. Planning and control involve processes to identify, create, and execute activities to achieve specified goals.

Smart architectural diagram recommendation engine 350 analyzes multifarious inputs of software artifacts, requirements, types, statement of work, statement of purpose, technical requirements, functional and non-functional components, accessibility, security requirements, use case, end users, roles, standard and customized service level agreements, platform-as-a-service (PaaS), infrastructure-as-a-service (IaaS), software-as-a-service (SaaS), etc., for any business functionality or software solution. The smart architectural diagram recommendation engine 350 recommends steps for creating and validating multifarious model diagrams during creation of software architectures.

The smart architectural diagram recommendation engine 350 derives a checklist of software elements, user roles, etc., based on analysis of the software requirements 320. The smart architectural diagram recommendation engine 350 generates a relationship graph to represent relationships between roles, software components, services, and software requirements. Also, the smart architectural diagram recommendation engine 350 uses rules, classifiers, and neural networks to analyze the software requirements 320 and the software architectural diagram image 315, to detect discrepancies, and to generate recommendations. More particularly, the smart architectural diagram recommendation engine 350 analyzes statement of work, statement of purpose, technical requirements, functional and non-functional requirements, accessibility, security requirements, use case, end users, roles, standard and customized service level agreements, etc. in software requirements 320 and compares the results of the analysis to the software components, user roles, services, etc. detected in architectural diagram image 315.

Smart architectural diagram recommendation engine 350 recommends placement of different components, networks, actors, third party integrations, services, and blocks (user profiles, services, firewalls, connections, configurations, etc.) and their corresponding limits during the creation of digital architectural diagram images. Smart architectural diagram recommendation engine 350 performs textual requirement analysis. From a historical knowledge corpus, smart architectural diagram recommendation engine 350 invention identifies which architectural blocks and components are to be used. Smart architectural diagram recommendation engine 350 also uses architectural templates 360 and selects an appropriate template. For example, if the number of users is 100 versus 1000, then a different template may be selected.

Smart architectural diagram recommendation engine 350 recommends appropriate connection types for multifarious components and blocks based on security constraints. Smart architectural diagram recommendation engine 350 also alerts for connections that are permitted or not permitted based on the software requirements 320. In one embodiment, smart architectural diagram recommendation engine 350 may analyze policy definitions and predefined guidelines with the software requirements 320. Smart architectural diagram recommendation engine 350 may analyze the keywords from the requirements and identify which architectural components are to be selected. Smart architectural diagram recommendation engine 350 may also select an appropriate architectural diagram template for drawing the diagram.

Smart architectural diagram recommendation engine 350 recommends appropriate data flow and pipeline sequence between various components, networks, user profiles, services, blocks, and connection types. Dataflow is often defined using a model or diagram in which the entire process of data movement is mapped as it passes from one component to the next within a program or a system, taking into consideration how it changes form during the process. A data pipeline is a series of data processing steps. If the data is not currently loaded into the data platform, then it is ingested at the beginning of the pipeline. Then, there is a series of steps in which each step delivers an output that is the input to the next step. This continues until the pipeline is complete. In some cases, independent steps may be run in parallel. Data pipelines consist of three key elements: a source, a processing step or steps, and a destination. In some data pipelines, the destination may be called a sink. Data pipelines enable the flow of data from an application to a data warehouse, from a data lake to an analytics database.

Smart architectural diagram recommendation engine 350 recommends appropriate steps and sequences during creation of digital architectural diagram images according to the software requirements 320. As such, the architectural diagram images are created in an optimized manner.

Smart architectural diagram recommendation engine 350 validates architectural diagram 315 for discrepancies or breaches in software on the blocks, components on the basis of security, functionality, firewall, connection types, and services during the creation of new or existing architectural diagram images. Smart architectural diagram recommendation engine 350 generates alerts when a discrepancy or breach of security is detected. Smart architectural diagram recommendation engine 350 then outputs an annotated architectural diagram image 355 with recommendations. Smart architectural diagram recommendation engine 350 learns from historical incident logs of one or more software systems, thereby determining the optimal data pipeline or security or firewall components to be in place for a secure data flow. Smart architectural diagram recommendation engine 350 thereby suggests the correlated diagram element/component in an architectural diagram image.

Smart architectural diagram recommendation engine 350 creates a corpus of digital diagram images and their correlated standard software requirements. The corpus 380 is a historical data store comprising multifarious architectural diagram images, their types, and their corresponding software requirement artifacts. Smart architectural diagram recommendation engine 350 is an evolving system and thus the utility of corpus generation is important to re-learn and/or evolve the machine learning model based on real time security incidents, accessibility, or software in work. Smart architectural diagram recommendation engine 350 classifies architectural diagram image 315 into standard templates 360 based on the depth and level of control, security, complexity, etc. The standard templates 360 include industry-based, technology, platform, business need, security, etc. Classification is used to classify different layouts, templates, diagram elements, blocks, and components, as well as the software artifacts/requirement documents preprocessed by NLP techniques.

Smart architectural diagram recommendation engine 350 automatically creates multifarious templated standard architectural diagrams and models using AI-based historical learning and corpus generation using transfer learning. The multifarious templated standard architectural diagrams and models may include system context diagram, use case model, architectural overview diagram, static functional view, data model, interaction diagram, logical location view, zone model, logical operational model, reference architecture, sized operational model, unsized physical operational model, etc. As stated above, smart architectural diagram recommendation engine 350 is an evolving system. Further, Transfer learning is used to recommend architectural diagram and/or diagram elements, components, etc., to a similar software system classified by industry genre, technology, platform, business need, security, etc.

Smart architectural diagram recommendation engine 350 enables AI-based architectural diagram test beds 370 and testing sequences wherein the system can take in existing diagrams and validate them with recommendations of how the diagram images are to be evolved or auto-scaled in alignment with software requirements 320 and types. Test beds provide test automation wherein the proposed system will be able to input any existing architectural diagram images and conduct a test automation to determine the optimization areas (evolve a component and/or suggest another component) and alert areas (red flag lack of a firewall system in a data pipeline flow etc.).

The AI and ML techniques of the illustrative embodiments may be implemented by using different image-based classifiers including, but not limited to, supervised ML techniques like support vector machines and neural network techniques like convolutional neural network (CNN), artificial recurrent neural network, long short-term memory (LSTM), etc. These classifiers would be trained to recognize different types of diagram layout, elements, such as software components, networks, firewalls, pipelines, servers, devices, gateways, types, graphs that represent objects, classes, states, etc., with various forms such as rectangle, ellipse, arrowheads, and some defined notations, etc. Other classifiers are trained to recognize legends. Optical Character Recognition (OCR) and OpenCV are used to detect and/or optimize diagram elements with multifarious steps including, but not limited to, contour detection, shape detection, de-skewing, edge smoothening, standardization, component location detection, arrow, line, label detection, recognize text labels, image and label normalization etc. In addition, natural language processing is used to analyze labels to detect keywords, grammatical error correction, and stop word detection. OpenCV (Open-Source Computer Vision Library) is an open-source computer vision and machine learning software library.

The illustrative embodiment may also model the relationship between two or more diagram elements of a software component including, but not limited to, networks, firewalls, etc., which is reflected by the spatial configurations between them, e.g., their relative positions and relative sizes and spatial properties, thereby correlating with legends. The illustrative embodiments may also build a relationship graph model (one to one, two to one, one to many, many to many) of all the diagram elements of an architectural diagram using techniques such as graph neural network, further using neural network techniques including, but not limited to, Markov Chain Monte Carlo, Generative Adversarial Networks, and Convolutional GAN. The embodiment may also be able to generate layouts, templates, objects, relationships between one or more diagram elements, translation of diagram element properties including, but not limited to, color, shape, depth, etc.

Aspects of the illustrative embodiments may be applied to any known types of software architectural diagrams, including system context diagram, use case model, architecture overview diagram, static functional view, data model, dynamic view, logical location view, logical operational model, and reference model. A use case model is used to show how users interact with the system in order to solve a problem. As such, the use case model defines the user's objective, the interactions between the system and the user, and the system's behavior required to meet these objectives. The architecture overview diagram contains the solution architecture that facilitates understanding of the detailed solution elements and their mutual relationships. The static functional view describes the software components of the system, their responsibilities, relationships, and the way they collaborate to implement the required functionality. The data model defines main business entities and the way these entities are connected to each other and how they are processed and stored inside the system. The data model explicitly determines the structure of data. The dynamic view shows the architecturally significant use cases. Identified actors, along with logical nodes, are placed onto the logical location view. In addition, the identified deployment units are "deployed" onto nodes in the model. The reference model covers an end-to-end scenario of a user accessing a Web application on cloud infrastructure.

Figure 4A:
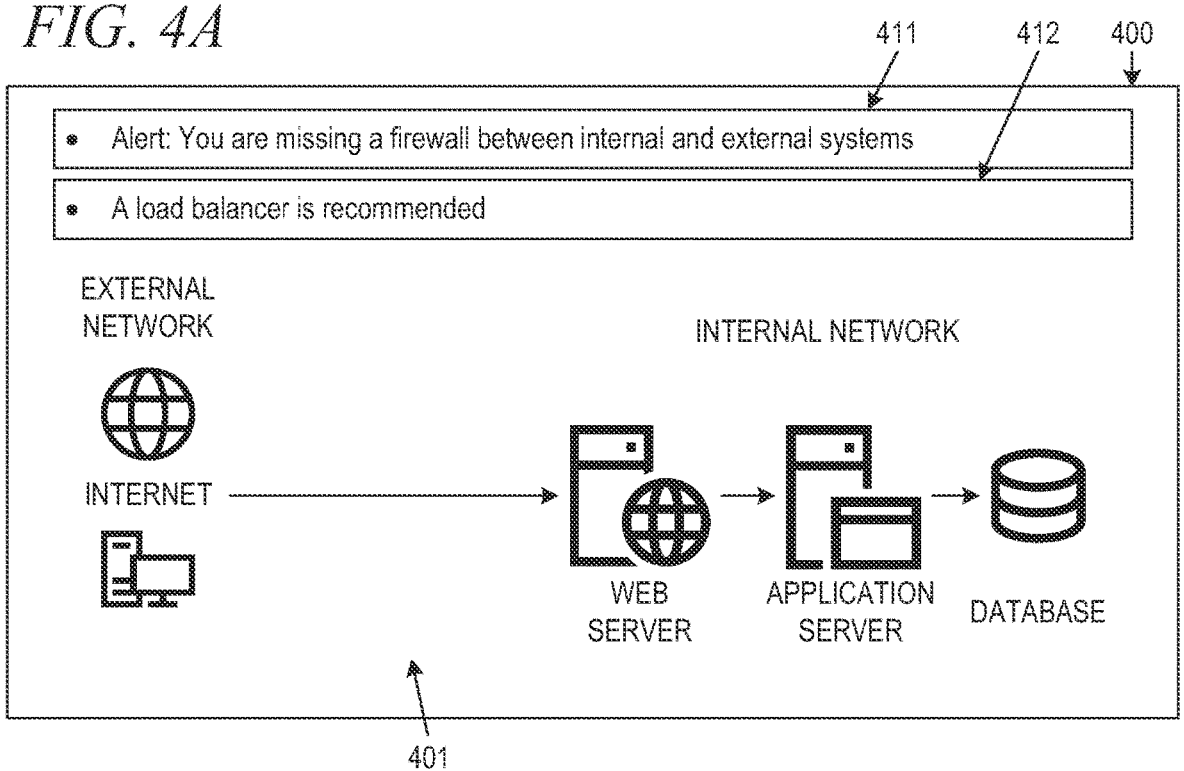
FIGS. 4A-4D illustrate example screens of display for providing recommendations for a software architectural diagram in accordance with an illustrative embodiment.

FIGS. 4A-4D illustrate example screens of display for providing recommendations for a software architectural diagram in accordance with an illustrative embodiment. With reference to FIG. 4A, the smart architectural diagram recommendation engine displays 400 presents digital software architectural diagram image 401. In the depicted example, the smart architectural diagram recommendation engine presents an alert 411 and a recommendation 412. The alert 411 notifies the user that the software architectural diagram image 401 is missing a firewall between the external network and the internal network. The smart architectural diagram recommendation engine also recommends including a load balancer.

Figure 4B:
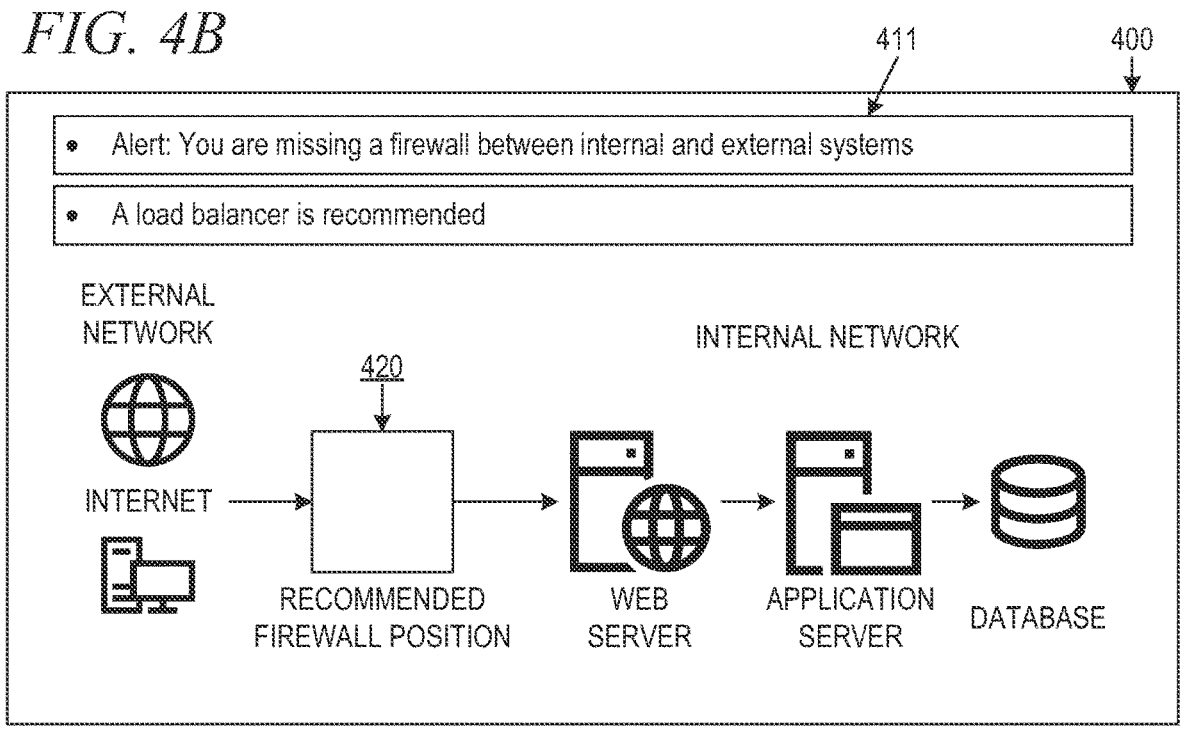
Figure 4C:
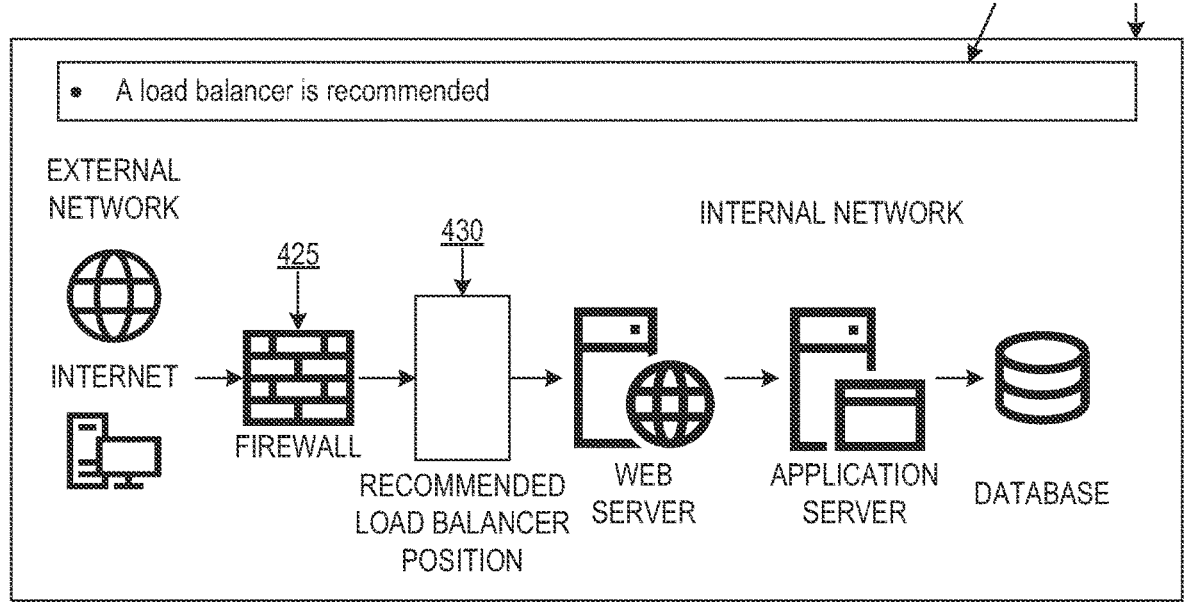
Figure 4D:
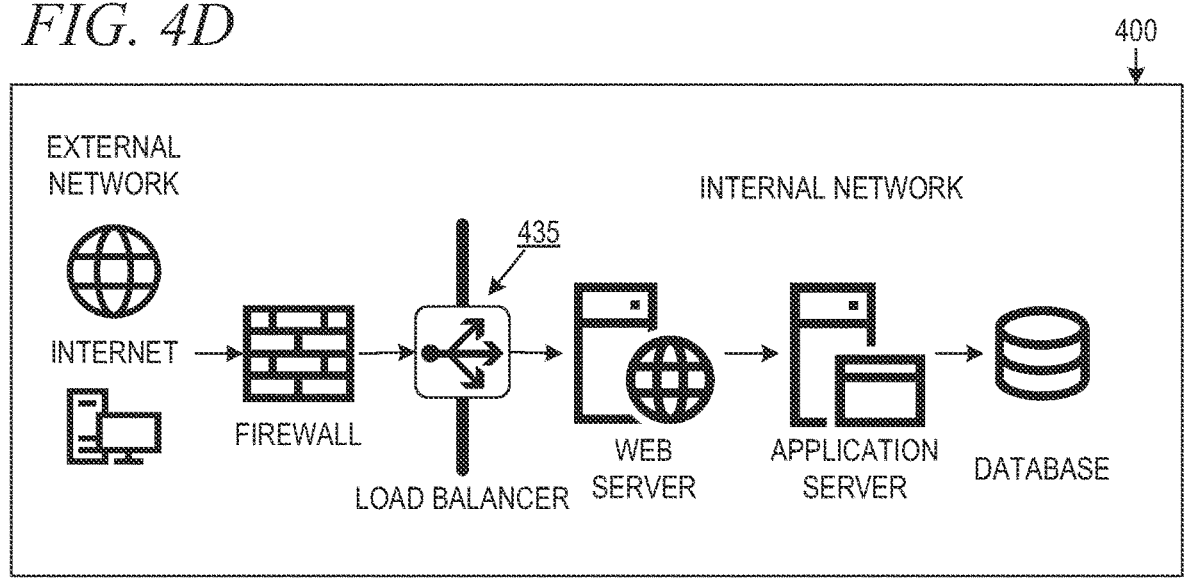

Turning to FIG. 4B, in response to the user selecting alert 411, the smart architectural diagram recommendation engine presents a recommended firewall position 420. Then, in FIG. 4C, the smart architectural diagram recommendation engine places firewall 425 in the software architectural diagram image in response to the user accepting the recommended position 420. Also, in response to the user selecting recommendation 412, the smart architectural diagram recommendation engine presents a recommended load balancer position 430. Turning to FIG. 4D, in response to the user accepting the recommended load balancer position, the smart architectural diagram recommendation engine places load balancer 435 in the software architectural diagram image.

Figure 5:
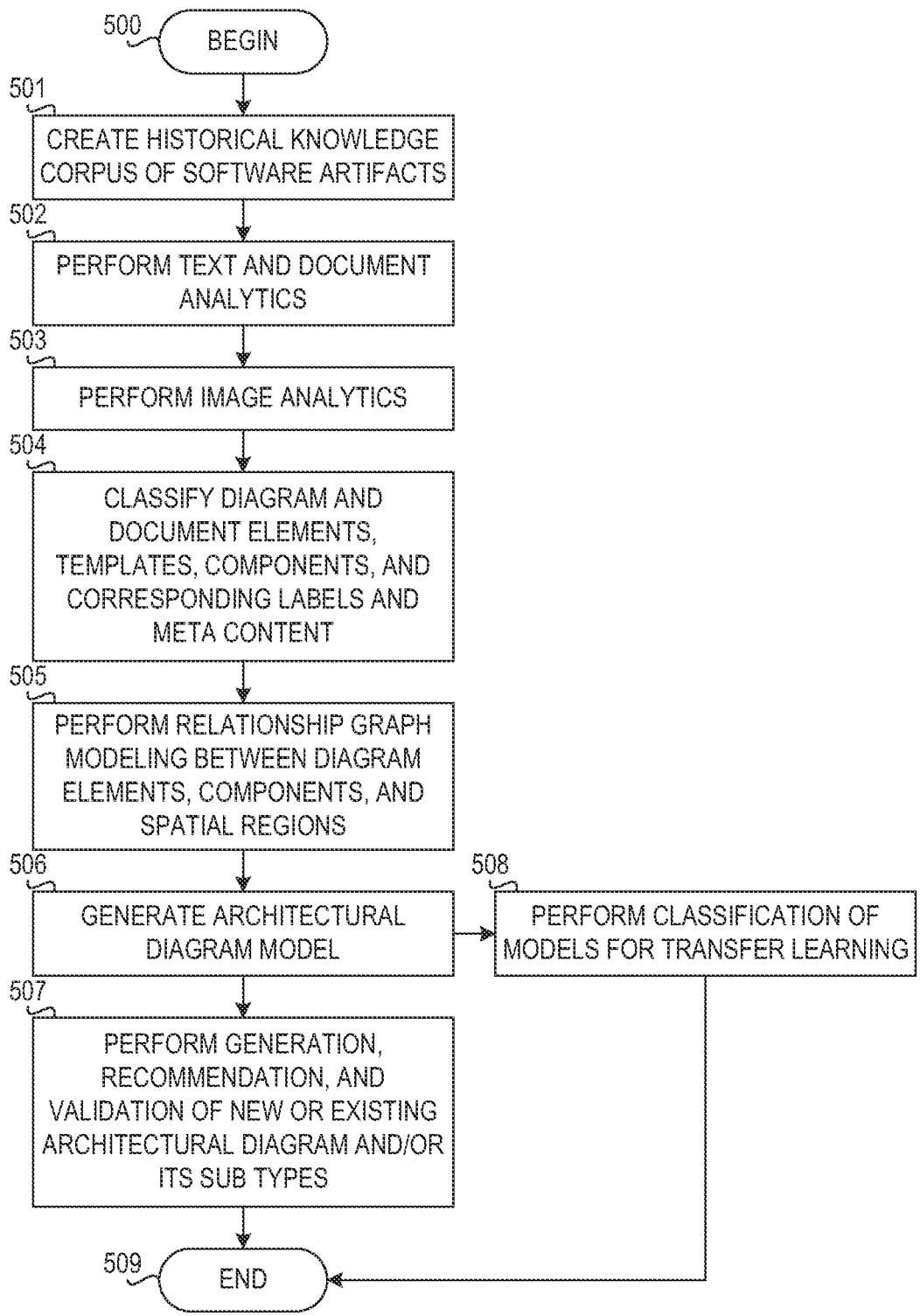
FIG. 5 is a flowchart illustrating generating machine learning models for the smart architectural diagram recommendation engine in accordance with an illustrative embodiment.

FIG. 5 is a flowchart illustrating generating machine learning models for the smart architectural diagram recommendation engine in accordance with an illustrative embodiment. Operation begins (block 500), and the smart architectural diagram recommendation engine creates a historical knowledge corpus of software artifacts (block 501). The software artifacts may include, for example, one or more architectural diagram images or software requirements documents.

The smart architectural diagram recommendation engine performs text and document analytics on the software requirements documents (block 502). The smart architectural diagram recommendation engine may use natural language processing (NLP), optical character recognition (OCR), parsers, neural networks, etc. For instance, the smart architectural diagram recommendation engine may employ a rotational you-only-look-once (R-YOLO) convolutional neural network (CNN) to detect arbitrarily oriented texts in documents.

The smart architectural diagram recommendation engine then performs image analytics (block 503). In one embodiment, the image analysis may use neural networks, OCR, and the like. The neural networks may include CNN, LSTM, artificial neural network (ANN), R-YOLO, or the like.

Next, the smart architectural diagram recommendation engine classifies the diagram image and document elements, templates, components, and corresponding labels and meta content (block 504). The smart architectural diagram recommendation engine performs relationship graph modeling between diagram elements, components, and spatial regions (block 505). Then, the smart architectural diagram recommendation engine generates an architectural diagram machine learning (ML) model (block 506). The architectural diagram ML model is generated based on the text and document analytics, the image analytics, classification of diagram and document elements, templates, and components, and the relationship graph modeling. The smart architectural diagram recommendation engine generates the architectural diagram ML model using a generative adversarial network (GAN), conditional GAN (CGAN), Markov chain, or convolutional neural network (CNN). Based on this architectural diagram ML model, the smart architectural diagram recommendation engine performs generation, recommendation, and validation of a new or existing digital architectural diagram image and/or its sub types (block 507) and performs classification of ML models for transfer learning (block 508). Thereafter, operation ends (block 509).

Figure 6:
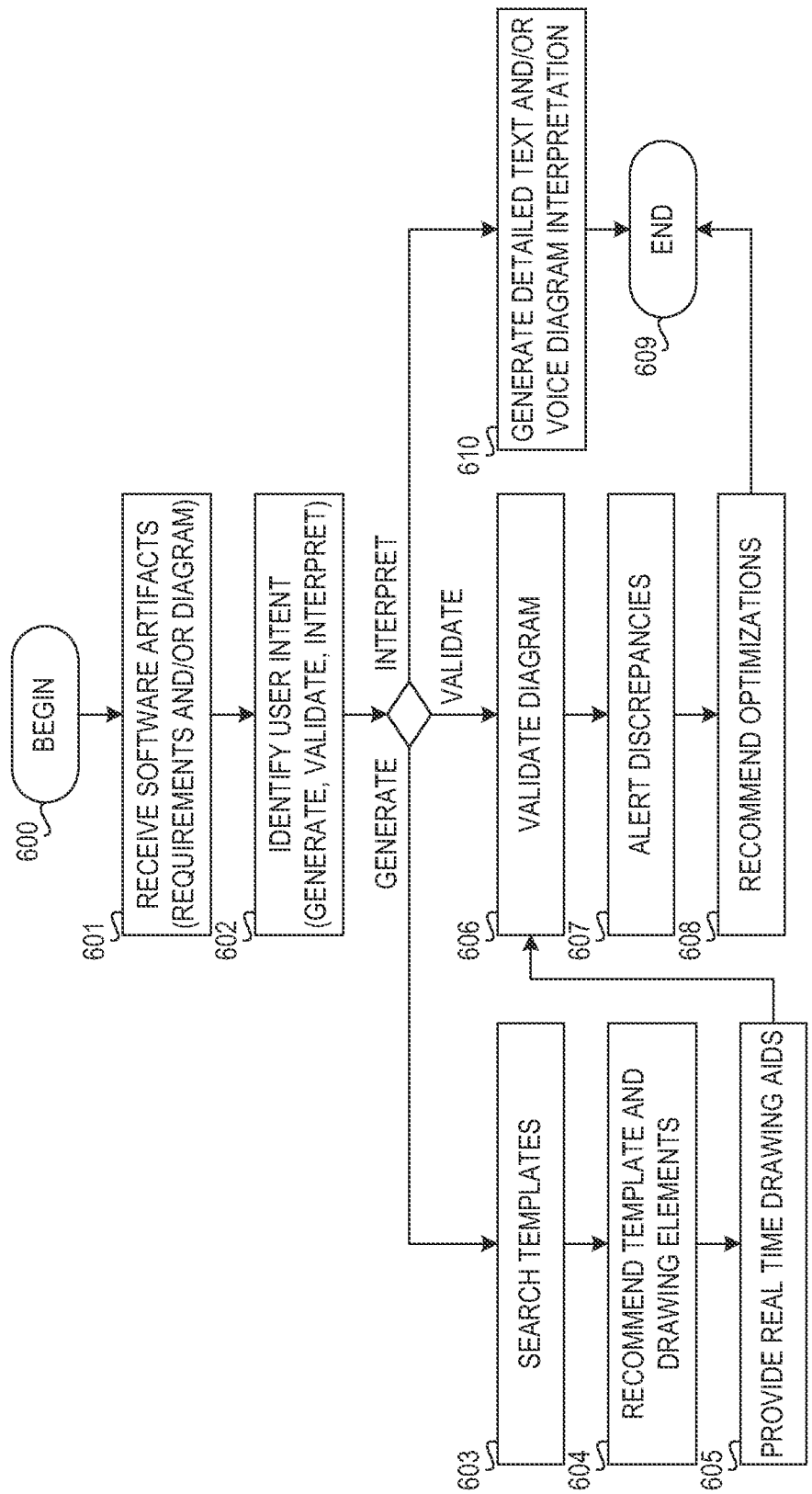
FIG. 6 is a flowchart illustrating operation of the smart architectural diagram recommendation engine in accordance with an illustrative embodiment.

FIG. 6 is a flowchart illustrating operation of the smart architectural diagram recommendation engine in accordance with an illustrative embodiment. Operation begins (block 600), and the smart architectural diagram recommendation engine receives software artifacts (requirements and/or digital diagram image) (block 601). The smart architectural diagram recommendation engine identifies user intent (generate, validate, interpret) (block 602).

If the user intent is to generate a new digital architectural diagram image, the smart architectural diagram recommendation engine searches templates (block 603), recommends a template and drawing elements based on the software requirements (block 604), and provides real time drawing aids (block 605). Thereafter, operation proceeds to block 606 to begin validating the drawing or diagram image created by the user.

If the user intent is to validate an architectural diagram image, the smart architectural diagram recommendation engine validates the diagram image based on the software requirements (block 606), alerts the user about detected discrepancies (block 607), and recommends optimizations (block 608). Thereafter, operation ends (block 609).

If the user intent is to interpret a digital software architectural diagram image, the smart architectural diagram recommendation engine generates detailed text and/or voice diagram interpretation (block 610). Thereafter, operation ends (block 609).

FIG. 7 is a flowchart illustrating operation of a smart architectural diagram recommendation system in accordance with an illustrative embodiment. Operation begins (block 700), and the smart architectural diagram recommendation system analyzes software artifacts, requirements, and types (block 701). The artifacts, requirements, and types may include, for example, statement of work, statement of purpose, technical requirements, functional and non-functional components, accessibility, security requirements, use case, end users, roles, standard and customized service level agreements, etc.

The system analyzes software types (block 702). The software types may include, for example, platform-as-a-service (PaaS), infrastructure-as-a-service (IaaS), software-as-a-service (SaaS), etc. The system then analyzes software artifacts in the digital architectural diagram image using machine learning (ML) and artificial intelligence (AI) techniques (block 703). The ML and AI techniques may include, for example, optical character recognition (OCR), document parser, natural language processing, text analytics, etc. The system identifies different types of drawings, name of technologies, implementation steps, workflow, textual information, best practices, etc. (block 704).

The system has an image analysis module and natural language processing module for analyzing the reference architecture diagram images. The system creates a knowledge corpus considering various business functional areas, technical implementation, etc. The system also analyzes application-specific information and compares this information with each component during creation of the architectural models and diagram images. The system intelligently recommends steps for creating multifarious model diagrams during creation of architectures like system context diagram, use case model, static and dynamic model, logical operational model, logical location model, etc. The system also intelligently recommends steps for validating multifarious model diagrams during creation of architectures. The system recommends intelligent placement of different components, network actors, third party integrations, services, and blocks. The system also recommends limits for each of the components (user profiles, services, firewall, connections, configuration, etc.) during the creation of digital architectural diagram images. The system further recommends appropriate connection types of multifarious components and blocks. The system recommends modifications based on security constraints of the architectural diagram image for any connection-based software requirements. The system recommends appropriate data flow and pipeline sequence between various components, network, user profiles, services, blocks, and connection types. The system recommends appropriate steps and sequences during creation of the architectural diagram images aligning to the software requirements. The system recommends appropriate steps and sequences to optimize or scale the architectural diagram images based on any additional requirement. The system validates and alerts for any discrepancies or breaches on the blocks, components of various architectural diagram images and models on the basis of security, functionality, firewall, connection types, and services during the creation of digital architectural diagram images.

Thus, the system recommends placement of components, connection types, data flow, and steps based on software requirements (block 705). The system validates the digital architectural diagram image (block 706) and determines whether any discrepancies or breaches of security are detected (block 707). If no discrepancies are detected, then operation ends (block 708). If a discrepancy or breach of security is detected in block 707, then the system generates an alert (block 709). Thereafter, operation returns to block 705 to recommend placement of components, connection types, data flow, and steps based on software requirements.

The system also creates a corpus of diagram images and their corresponding correlated standard software requirements. The system also classifies architectural diagram images into standard templates, such as industry-based, technology-based, platform-based, business need-based, security-based, etc., based on the depth and level of control, security, complexity, etc. The system also creates multifarious templated standard architectural diagram images and models. The system can enable AI-based architectural diagram test beds and testing sequences. The system can take in existing diagram images and validate them with recommendations of how the diagram images are to be evolved or auto scaled in alignment with software requirements and types.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions executed by the at least one processor to cause the at least one processor to implement an architectural diagram recommendation engine for software architectural diagram analysis and recommendation, the method comprising:

analyzing, by the architectural diagram recommendation engine, a software requirements specification document using natural language processing to identify functional requirements and security requirements;

analyzing, by the architectural diagram recommendation engine, a digital software architectural diagram image to identify functional components;

identifying, by the architectural diagram recommendation engine, one or more discrepancies between the functional components of the digital software architectural diagram image and the functional requirements or security requirements;

generating, by the architectural diagram recommendation engine, an alert concerning the one or more discrepancies; and presenting, by the architectural diagram recommendation engine, the alert in association with the digital software architectural diagram image.

2. The method of claim 1, wherein analyzing the software requirements specification document comprises analyzing statement of work, statement of purpose, technical requirements, functional and non-functional requirements, accessibility, security requirements, use case, end users, roles, and service level agreements in the software requirements specification document.

3. The method of claim 1, wherein analyzing the digital software architecture diagram image comprises applying one or more image-based classifiers.

4. The method of claim 1, wherein the one or more image-based classifiers comprise at least one of a support vector machine, convolutional neural network (CNN), artificial recurrent neural network, or long short-term memory (LSTM).

5. The method of claim 1, further comprising identifying a missing functional component and recommending a position for the missing functional component in the digital software architectural diagram image.

6. The method of claim 1, further comprising recommending a position for a missing functional component within the digital software architectural diagram image responsive to a user selecting the alert.

7. The method of claim 1, further comprising generating a recommendation of an optimization to the digital software architectural diagram image.

8. The method of claim 1, wherein the digital software architectural diagram image comprises a system context diagram, use case model, architecture overview diagram, static functional view, data model, dynamic view, logical location view, logical operational model, or reference model.

9. The method of claim 1, further comprising:
creating a knowledge corpus of historical software architectural diagram images and historical software requirements documents;
performing text and document analytics on the historical software requirements documents;
performing image analytics on the historical software architectural diagram images;
classifying diagram and document elements, templates, and components in the knowledge corpus;
performing relationship graph modeling between diagram elements, components, and spatial regions; and
generating an architectural diagram machine learning model based on the text and document analytics, the image analytics, and the relationship graph modeling.

10. The method of claim 9, wherein the architectural diagram machine learning model is generated using a generative adversarial network (GAN), conditional GAN (CGAN), Markov chain, or convolutional neural network (CNN).

11. The method of claim 1, further comprising:
searching templates based on the identified functional requirements and security requirements;
recommending a template and one or more drawing elements for creating a new software architectural diagram image; and
providing real time drawing aids for creating the new software architectural diagram image using the recommended template and one or more drawing elements.

12. The method of claim 11, wherein searching the templates comprises searching the templates based on type of drawing, technology, or software type.

13. A computer program product comprising a computer readable storage medium having a computer readable program stored therein, wherein the computer readable program, when executed on a computing device, causes the computing device to implement an architectural diagram recommendation engine for software architectural diagram analysis and recommendation, wherein the computer readable program causes the computing device to:
analyze, by the architectural diagram recommendation engine, a software requirements specification document using natural language processing to identify functional requirements and security requirements;
analyze, by the architectural diagram recommendation engine, a digital software architectural diagram image to identify functional components;
identify, by the architectural diagram recommendation engine, one or more discrepancies between the functional components of the digital software architectural diagram image and the functional requirements or security requirements;
generate, by the architectural diagram recommendation engine, an alert concerning the one or more discrepancies; and
present, by the architectural diagram recommendation engine, the alert in association with the digital software architectural diagram image.

14. The computer program product of claim 13, wherein analyzing the software requirements specification document comprises analyzing statement of work, statement of purpose, technical requirements, functional and non-functional requirements, accessibility, security requirements, use case, end users, roles, and service level agreements in the software requirements specification document.

15. The computer program product of claim 13, wherein analyzing the digital software architecture diagram image comprises applying one or more image-based classifiers.

16. The computer program product of claim 13, wherein the one or more image-based classifiers comprise at least one of a support vector machine, convolutional neural network (CNN), artificial recurrent neural network, or long short-term memory (LSTM).

17. The computer program product of claim 13, wherein the computer readable program further causes the computing device to identify a missing functional component and recommending a position for the missing functional component in the digital software architectural diagram image.

18. The computer program product of claim 13, wherein the computer readable program further causes the computing device to:
create a knowledge corpus of historical software architectural diagram images and historical software requirements documents;
perform text and document analytics on the historical software requirements documents;
perform image analytics on the historical software architectural diagram images;
classify diagram and document elements, templates, and components in the knowledge corpus;
perform relationship graph modeling between diagram elements, components, and spatial regions; and
generate an architectural diagram machine learning model based on the text and document analytics, the image analytics, and the relationship graph modeling.

19. The computer program product of claim 13, wherein the computer readable program further causes the computing device to:
search templates based on the identified functional requirements and security requirements;
recommend a template and one or more drawing elements for creating a new software architectural diagram image; and
provide real time drawing aids for creating the new software architectural diagram image using the recommended template and one or more drawing elements.

20. An apparatus comprising:
a processor; and
a memory coupled to the processor, wherein the memory comprises instructions which, when executed by the processor, cause the processor to:
analyze, by the architectural diagram recommendation engine, a software requirements specification document using natural language processing to identify functional requirements and security requirements;
analyze, by the architectural diagram recommendation engine, a digital software architectural diagram image to identify functional components;
identify, by the architectural diagram recommendation engine, one or more discrepancies between the functional components of the digital software architectural diagram image and the functional requirements or security requirements;

generate, by the architectural diagram recommendation engine, an alert concerning the one or more discrepancies; and present, by the architectural diagram recommendation engine, the alert in association with the digital software architectural diagram image.

\* \* \* \* \*